United States Patent Office 3,660,283
Patented May 2, 1972

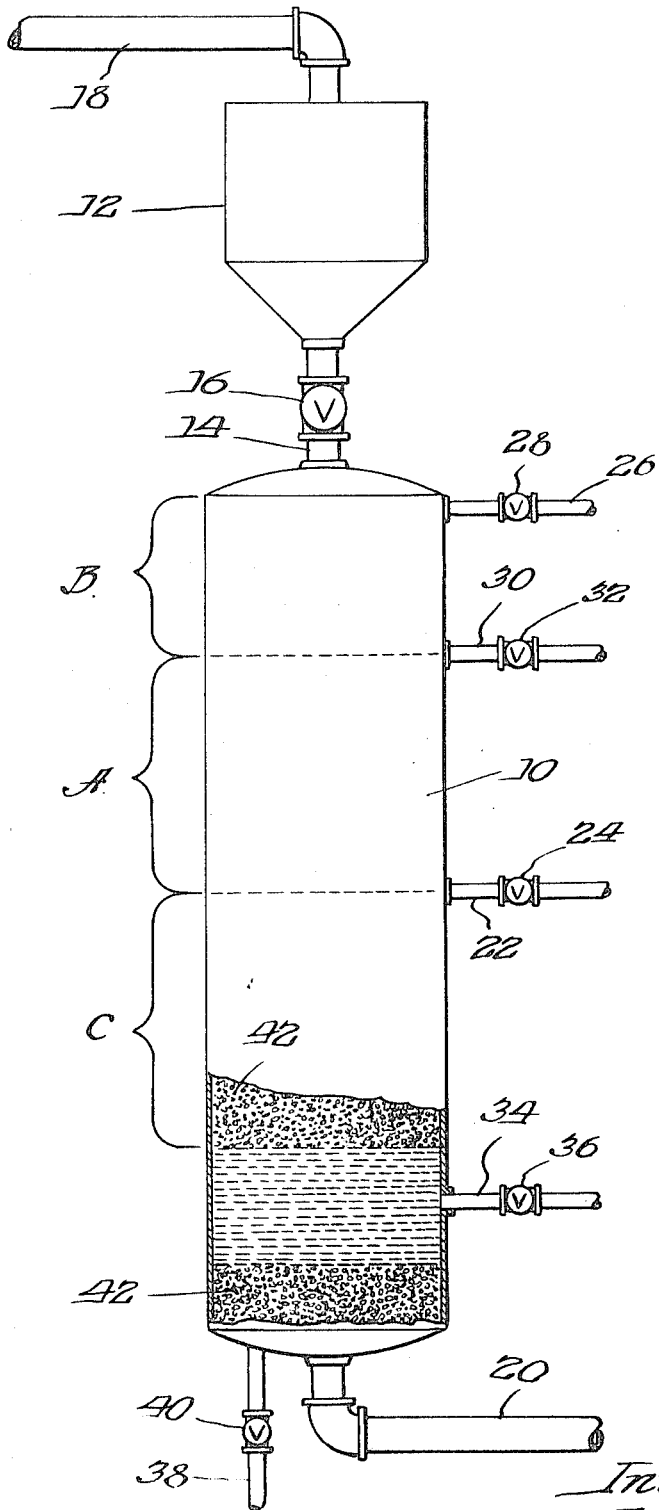

3,660,283
METHOD FOR REGENERATING CATION EXCHANGE RESIN
Leo F. Ryan, Somerville, N.J., assignor to Ecodyne Corporation, Chicago, Ill.
Filed Oct. 7, 1969, Ser. No. 864,347
Int. Cl. B01d *15/06*
U.S. Cl. 210—33     5 Claims

ABSTRACT OF THE DISCLOSURE

A method is provided for regenerating cation exchange resin containing insoluble sulfate-forming cations while preventing the formation of sulfate precipitates. In carrying out the method, sulfuric acid is introduced into a regeneration column at a regenerant inlet to establish a concentrated regenerant zone. Exhausted regenerant is withdrawn from the column at an outlet. In accordance with the invention, dilution water is introduced into the column between the regenerant inlet and the outlet to form a dilute regenerant zone. During regeneration, the resin passes first through the dilute regenerant zone, where it is partially regenerated. The resin is then further regenerated in the concentrated regenerant zone.

---

The present invention relates to an improved method for regenerating ion exchange resin, and more specifically to an improved method for regenerating cation exchange resin with sulfuric acid.

Cation exchange resins that have been employed in the purification of water will ordinarily contain a number of cations at the ion exchange sites, including the "hardness" ions, such as calcium and magnesium. As a result, when sulfuric acid is employed as the regenerant, there is a substantial danger that the regeneration column will become clogged or the resin contaminated with a precipitate of calcium sulfates, which is only slightly soluble in water. Because of this problem, hydrochloric acid has often been substituted for sulfuric acid as a regenerant. Even through hydrochloric acid is more expensive, no insoluble salts are formed.

Generally, the present invention provides an efficient and economical method for regenerating cation exchange resins that contain insoluble sulfate-forming cations in a regeneration column without forming a sulfate precipitate. The term "insoluble sulfate-forming cations" refers to all cations which form sulfates that are only slightly soluble in water. This category includes primarily the alkali earths below magnesium in the periodic table, i.e., calcium, strontium, and barium. Of these, calcium is by far the most abundant in most waters. In carrying out the method, sulfuric acid is introduced into a column containing cation exchange resin with insoluble sulfate-forming cations at the ion exchange sites. The sulfuric acid is introduced into the column at a regenerant inlet, and is contacted with this resin within the column. Exhausted regenerant is withdrawn from the column at an outlet. In accordance with the present invention, dilution water is introduced into the column between the regenerant inlet and the outlet during the introduction of sulfuric acid. This method therefore creates a concentrated regenerant zone followed by a dilute regenerant zone as the regenerant proceeds from the regenerant inlet to the outlet. During regeneration, the resin passes first through the dilute regenerant zone, where it is partially regenerated but still contains residual insoluble sulfate-forming cations. The resin is then transferred to the concentrated regenerant zone, where it is further regenerated.

The invention will be best understood from the following detailed description, taken together with the drawing, which is a cutaway elevation view of a regeneration column which is adapted to carry out the method of the present invention.

Referring to the drawing, there is depicted a regeneration tank or column 10 with an exhausted resin hopper 12 communicating with an upper portion thereof through a resin input conduit 14 having a valve 16. Exhausted cation exchange resin is delivered to the exhausted resin hopper 12 via an exhausted resin transfer conduit 18. As is well known to those skilled in the art, in a two-bed system, i.e., one having separate cation and anion exchange resin service columns, the exhausted resin transfer conduit 18 will communicate directly with the cation exchange resin column (not shown). In a mixed-bed system, the exhausted transfer conduit 18 will communicate with a separation column (not shown).

Regenerated resin is returned to the service column (not shown) via a regenerated resin transfer conduit 20. As is well known to those skilled in the art, the regenerated resin transfer conduit 20 may communicate with a wash column, an ammoniation column, or other further resin treatment means prior to the service column.

In the apparatus shown in the drawing, the regeneration column 10 has communicating therewith a regenerant inlet pipe 22 having a valve 24 and an upper outlet pipe 26 having a valve 28. As this apparatus is designed for upflow regeneration, in accordance with the preferred embodiment, the outlet pipe 26 communicates with the column 10 above the regenerant inlet pipe 22.

Between the regenerant inlet pipe 22 and the outlet pipe 26, a dilution water inlet pipe 30 having a valve 32 communicates with the column 10. Finally, a separation water inlet pipe 34 having a valve of 36 communicates with the column 10 below the regenerant inlet pipe 22. A drain 38 having a valve of 40 communicates with the bottom of column 10.

In carrying out the method of the present invention with the apparatus shown in the drawing, charges of exhausted resin are periodically delivered to the column 10 by opening the valve of 40 on the drain 38 to depressurize the column. Simultaneously, the valve 16 on the resin input conduit 14 is opened, and exhausted resin in the exhausted resin hopper 12 flows downwardly into the column 10, filling it with resin. After the column 10 has been filled, the valves 40, 16 on the drain 38 and resin input conduit 14 respectively, are closed. The valves 28, 32, 24, 36, located respectively on the outlet pipe 26, the dilution water inlet pipe 30, the regenerant inlet pipe 22, and the separation water inlet pipe 34 are all opened. Water is delivered to the column 10 through the separation water inlet pipe 34 at a rate sufficient to compact a major portion of the ion exchange resin 42 into an upper portion column 10, while forcing the remainder of the resin downwardly into the regenerated resin transfer conduit 20. A separation or gap is thus established in the ion exchange resin within the column 10, as shown in the drawing. The separation water, which flows upwardly through the regeneration column 10, serves to rinse the resin 42 below the level of the regenerant inlet pipe 22.

Sulfuric acid regenerant is delivered to the resin through the regenerant inlet pipe 22. This acid should be of a sufficient concentration to efficiently regenerate the particular resin being used, taking into account the level of impurities in the water being treated in the service column.

In accordance with the present invention, dilution water is introduced into the column 10 and at the dilution water inlet pipe 30. The rate at which the dilution water is delivered depends upon a number of factors, including the rate at which the sulfuric acid regenerant is being delivered, the concentration of the sulfuric acid, the type of resin being regenerated, and the amount of insoluble sulfate-forming cations contained by the resin being regenerated. In any event, the flow rate at the dilution water inlet pipe 30 should be sufficient to prevent the formation of insoluble sulfate precipitates.

As can be seen from the foregoing description, the location of the regenerant inlet pipe 22 and dilution water inlet pipe 30 creates a concentrated regenerant zone, designated by the letter A, and a dilute regenerant zone, designated by the letter B, within the regeneration column 10. Below the concentrated regenerant zone A is a rinsing zone C, in which the resin will be rinsed by the separation water alone.

Since resin is introduced at the top of the column 10, the most exhausted resin will be at the top, while the resin further down in the column will be more highly regenerated. Therefore, the resin passes first through the dilute regenerant zone B, where a portion of the contaminant is displaced by the dilute sulfuric acid regenerant. In the concentrated regenerant zone A, substantially all of the remaining cation contaminants are displaced by the more concentrated sulfuric acid.

The sulfuric acid in the concentrated regenerant zone A should be of a concentration sufficient to efficiently and economically complete the regeneration of the resin. In most cases, the acid concentration in the concentrated regenerant zone A should be about 0.3 to 1.0 normal. The flow rate at the dilution water inlet pipe 30 should be sufficient to reduce this concentration to about 0.2 to 0.6 normal in the dilute regenerant zone B.

During the periodic transfer of resin, as described above, sufficient resin should be transferred to move the resin in the dilute regenerant zone B to the concentrated regenerant zone A. At the same time, resin from the concentrated regenerant zone A is moved to the rinsing zone C, where excess sulfuric acid is removed. The resin in the dilute regenerant zone B is replaced by a new charge of exhausted resin from the exhausted resin hopper 12.

Those skilled in the art will appreciate when the method of the present invention is employed, it is possible to use higher sulfuric acid concentrations in the regeneration column 10 than was heretofore possible. As is well known in the art, an increase in the concentration of the regenerant increases the efficiency of regeneration, and therefore increases the overall economy of operation of the apparatus. Because of the introduction of dilution water into the resin in accordance with the present invention, the regenerant will be diluted before the concentration of insoluble sulfates becomes high enough to form any signficant amount of precipitate.

As previously mentioned, the method of the present invention is adapted to use with a number of well known solid cation exchange resins. These include those of the divinylbenzene-styrene copolymer type, the acrylic type, the sulfonated coal type, and the phenolic type. These resins are preferably employed as beads in the size range of about 16–60 mesh. Suitable bead resins are sold under the trade names Amberlite, manufactured and sold by Rohm & Haas Co. and Nalco resins sold by Nalco Chemical Co. Particularly suitable ion exchange resins are sold under the trade names Amberlite IRA–200 and IRA–120.

Obviously, many modifications and variations of the present invention may be made without departing from the spirit and scope thereof. For example, as is well known to those skilled in the art, it is not essential to employ separation water within the column, as other methods of transferring resin are well known. Furhermore, the column could be operated in downflow rather than an upflow direction by an obvious rearrangement of parts. While the embodiments disclosed herein are at present considered preferred, it is intended in the appended claims to cover all such modifications and variations of the invention as fall within the true spirit and scope thereof.

I claim:

1. A method for regenerating cation exchange resin containing insoluble sulfate-forming cations in a regeneration column comprising: introducing sulfuric acid into said column at a regenerant inlet to establish a concentrated regenerant zone; withdrawing exhausted regenerant from said column at an outlet; introducing dilution water into said sulfuric acid in said column between said regenerant inlet and said outlet to establish a dilute regenerant zone; partially regenerating said resin containing said insoluble sulfate-forming cations in said dilute regenerant zone; trasferring said resin containing residual insoluble sulfate-forming cations to said concentrated regenerant zone; and further regenerating said resin in said concentrated regenerant zone.

2. The method as defined in claim 1 wherein the concentration of said acid in said concentrated regenerant zone is about 0.3 to 1.0 normal, and wherein the concentration of said acid in said dilute regenerant zone is about 0.2 to 0.6 normal.

3. The method as defined in claim 1 wherein said regenerant inlet is below said outlet so that said regenerant travels in an upflow direction.

4. A method for regenerating cation exchange resin containing insoluble sulfate-forming cations in a regeneration column comprising: introducing separation water into a lower portion of said column at a separation water inlet to establish a rinsing zone, said separation water being introduced at a rate sufficient to compact a major portion of resin in an upper portion of said column; introducing sulfuric acid into said column at a regenerant inlet above said separation water inlet to establish a concentrated regenerant zone above said rinsing zone; introducing dilution water into said column at a dilution water inlet above said regenerant inlet to establish a dilute regenerant zone above said concentrated regenerant zone; withdrawing exhausted regenerant from said column; periodically transferring resin containing residual insoluble sulfate-forming cations from said dilute regenerant zone to said concentrated regenerant zone; and periodically transferring said resin from said concentrated regenerant zone to said rinsing zone, whereby to partially regenerate said resin in said dilute regenerant zone and to further regenerate said resin in said concentrated regenerant zone.

5. The method as defined in claim 4 wherein the concentration of said acid in said concentrated regenerant zone is about 0.3 to 1.0 normal, and wherein the concentration of said acid in said dilute regenerant zone is about 0.2 to 0.6 normal.

References Cited

UNITED STATES PATENTS 2,767,140  10/1956  Fitch _____ 210—33
3,458,440  7/1969  Schmidt _____ 210—32

FOREIGN PATENTS 881,015  11/1961  Great Britain _____ 210—33

REUBEN FRIEDMAN, Primary Examiner

T. G. WYSE, Assistant Examiner

U.S. Cl. X.R.

210—38